United States Patent
Kuo (10) Patent No.: US 11,098,847 B2
(45) Date of Patent: Aug. 24, 2021

(54) GREASE GUN WITH AN ADJUSTABLE OPERATING ANGLE

(71) Applicant: Shuoxing Metal Products (Kunshan) CO., LTD., Jiangsu (CN)

(72) Inventor: Heng-Chia Kuo, Jiangsu (CN)

(73) Assignee: Shuoxing Metal Products (Kunshan) CO., LTD., Kunshan (CN)

(*) Notice: Subject to any disclaimer, the term of this patent is extended or adjusted under 35 U.S.C. 154(b) by 80 days.

(21) Appl. No.: 16/736,569

(22) Filed: Jan. 7, 2020

(65) Prior Publication Data

US 2021/0207767 A1 Jul. 8, 2021

(51) Int. Cl.
*F16N 3/12* (2006.01)
*F16N 5/02* (2006.01)

(52) U.S. Cl.
CPC .............. *F16N 3/12* (2013.01); *F16N 5/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,812,643 A * | 6/1931 | Albertine | ............... | F16N 5/02 222/323 |
| 2,030,504 A * | 2/1936 | Davis | ............... | F16N 3/12 184/109 |
| 3,009,157 A * | 11/1961 | Kvavle | ............... | B25C 1/123 227/8 |
| 3,042,245 A * | 7/1962 | Schwartz | ............... | B21J 15/022 29/243.522 |
| 3,820,705 A * | 6/1974 | Beals | ............... | B25C 1/005 227/113 |
| 6,293,016 B1 * | 9/2001 | Sanderson | ............... | B64D 7/02 29/428 |

* cited by examiner

*Primary Examiner* — Frederick C Nicolas
*Assistant Examiner* — Randall A Gruby
(74) *Attorney, Agent, or Firm* — Wang Law Firm, Inc.

(57) ABSTRACT

A grease gun with an adjustable operating angle includes: a grease barrel having a first annular assembling portion and a first annular pivot portion; a gun body having a second annular assembling portion facing the first annular assembling portion and a second annular pivot portion to be pivotally disposed on the first annular pivot portion; a positioning ring fixed to the second annular assembling portion and having annularly arranged positioning cavities and facing the first annular assembling portion; and a positioning unit having a positioning member movable between a locked position and a release position, and the positioning member having a positioning portion to be inserted into or disengaged from the positioning cavities. The grease barrel and the gun body can be rotated and fixed relative to each other after rotation to adjust the angle between the two, which consequently reduces the space limitation on the grease feeding operation.

5 Claims, 8 Drawing Sheets

GREASE GUN WITH AN ADJUSTABLE OPERATING ANGLE

BACKGROUND

Field of the Invention

The present invention relates to a grease gun, and more particularly to a grease gun with an adjustable operating angle.

Related Prior Art

When in operation, most of the existing mechanical devices use a variety of lubricating oils to keep various interlocking mechanical components functioning properly. Among them, grease is one of the widely used lubricating oils.

Figure 1:
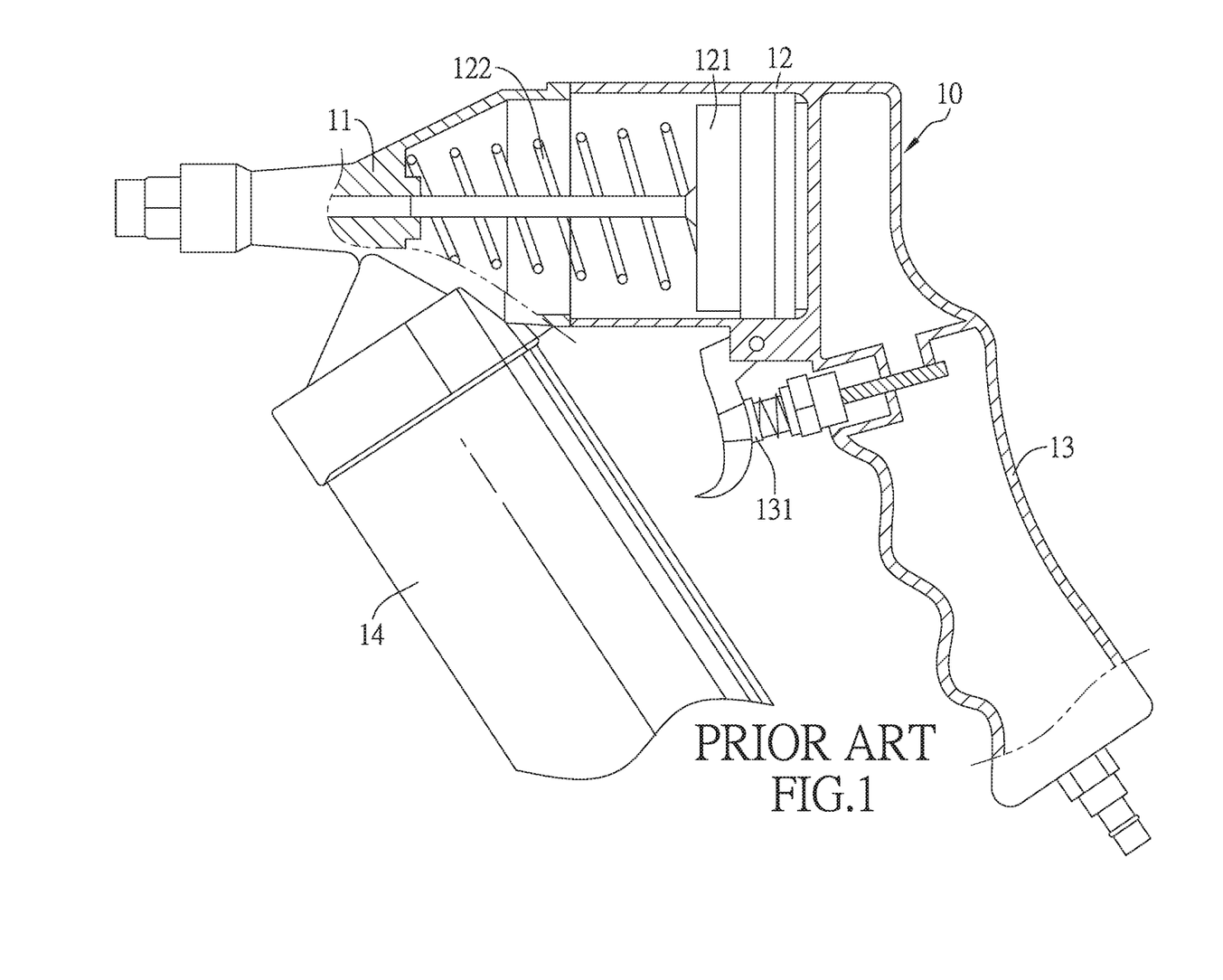
FIG. 1 is a schematic cross-sectional view of a conventional pneumatic grease gun.

Referring to FIG. 1, a schematic cross-sectional view of a conventional pneumatic grease gun 10 is shown, and the pneumatic grease gun 10 essentially comprises: a nozzle 11, a gun body 12, a handle 13 and a grease barrel 14. The nozzle 11 is a release outlet for the grease, and the gun body 12 is where the piston 121, the spring 122, and the like are disposed. A control button 131 is provided at a side of the handle 13 for the operator to press to release grease from the pneumatic grease gun 10.

When in use, the operator holds the handle 13 with one hand, then aligns the nozzle 11 with the workpiece and presses the control button 131 to release the grease to the predetermined position. However, the conventional pneumatic grease gun still has the following defects that need immediate improvement:

Since the angle between the handle 13 and the grease barrel 14 is fixed and cannot be adjusted, which will cause inconvenience in operating the grease gun due to the limitation by the working space or other factors during the oiling operation.

The present invention has arisen to mitigate and/or obviate the afore-described disadvantages.

SUMMARY

One objective of the present invention is to provide grease gun with an adjustable operating angle, which is able to reduce the space limitation on the grease feeding operation.

To achieve the above objective, a grease gun with an adjustable operating angle provided by the present invention comprises: a grease barrel having a first annular assembling portion and a first annular pivot portion; a gun body having a second annular assembling portion facing the first annular assembling portion and a second annular pivot portion to be pivotally disposed on the first annular pivot portion; a positioning ring fixed to the second annular assembling portion of the gun body and having a plurality of positioning cavities arranged in an annular manner and facing the first annular assembling portion; and a positioning unit having a positioning member movable between a locked position and a release position, and the positioning member having a positioning portion to be inserted into or disengaged from the positioning cavities;

when the positioning member is in the locked position, the positioning portion of the positioning member is inserted in one of the positioning cavities to prevent relative rotation between the grease barrel and the gun body, when the positioning member is in the release position, the positioning portion of the positioning member is disengaged from the positioning cavities to allow relative rotation between the grease barrel and the gun body, so as to adjust a relative angle between the grease barrel and the gun body.

The advantages of the present invention are that: with the pivoting connection of the grease barrel to the gun body, and the positioning unit with the positioning ring movable between the locked position and the release position, the grease barrel and the gun body can be rotated and fixed relative to each other after rotation, so as to adjust the relative angle between the grease barrel and the gun body, which consequently reduces the space limitation on the grease feeding operation.

Preferably, a sealing ring is provided between the first annular pivot portion and the second annular pivot portion.

Preferably, the positioning ring is fixed to the second annular pivot portion of the gun body by screws.

Preferably, an annular groove is formed in the first annular pivot portion, and a limiting ring is disposed in and partially protruded from the annular groove to push against the positioning ring.

Preferably, the grease barrel further has an assembling hole penetrating the first annular assembling portion, an annular shoulder is formed on an inner surface of the assembling hole, the positioning unit further includes a return spring and a connector, the positioning member is movably disposed in the assembling hole and sequentially provided with the positioning portion, a limiting portion, and a shaft portion extending out of the assembling hole, the return spring is sleeved on the shaft portion and has two ends abutted against the annular shoulder of the assembling hole and the limiting portion of the positioning member, respectively, and the connector is disposed on the shaft portion extending out of the assembling hole.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 2:
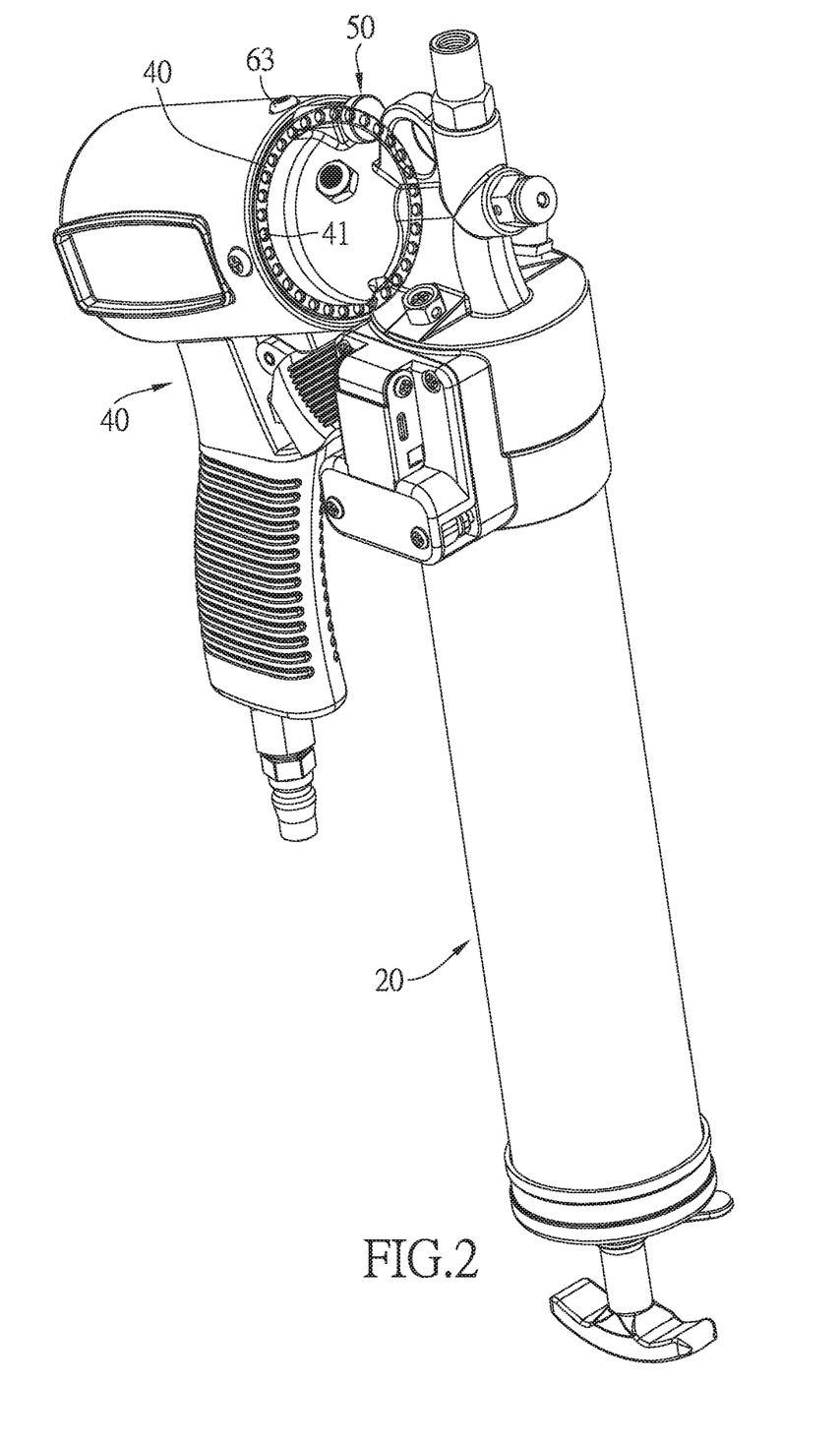
FIG. 2 is a perspective view of an embodiment of the present invention.
Figure 3:
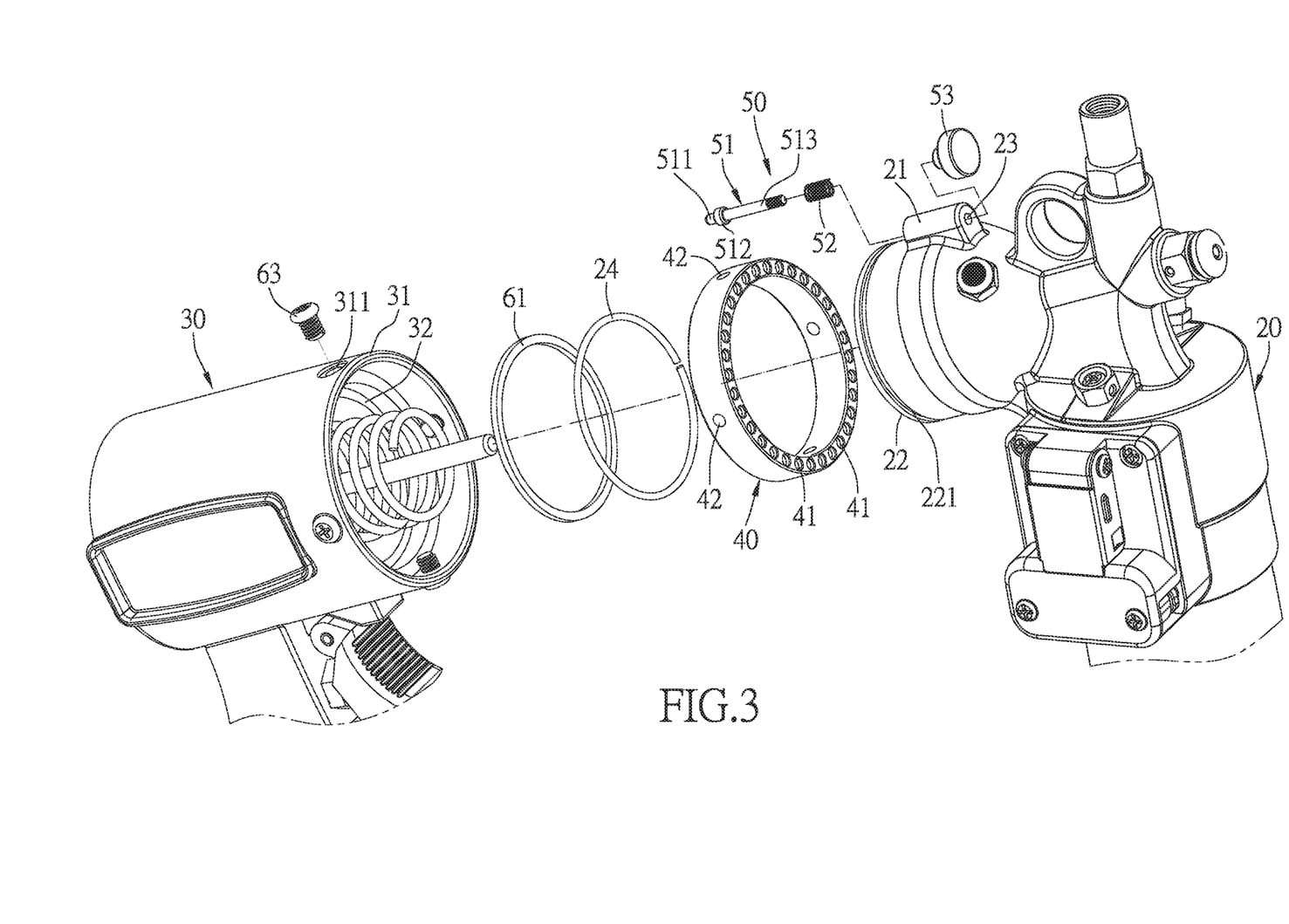
FIG. 3 is a partially exploded perspective view of the embodiment of the present invention.
Figure 4:
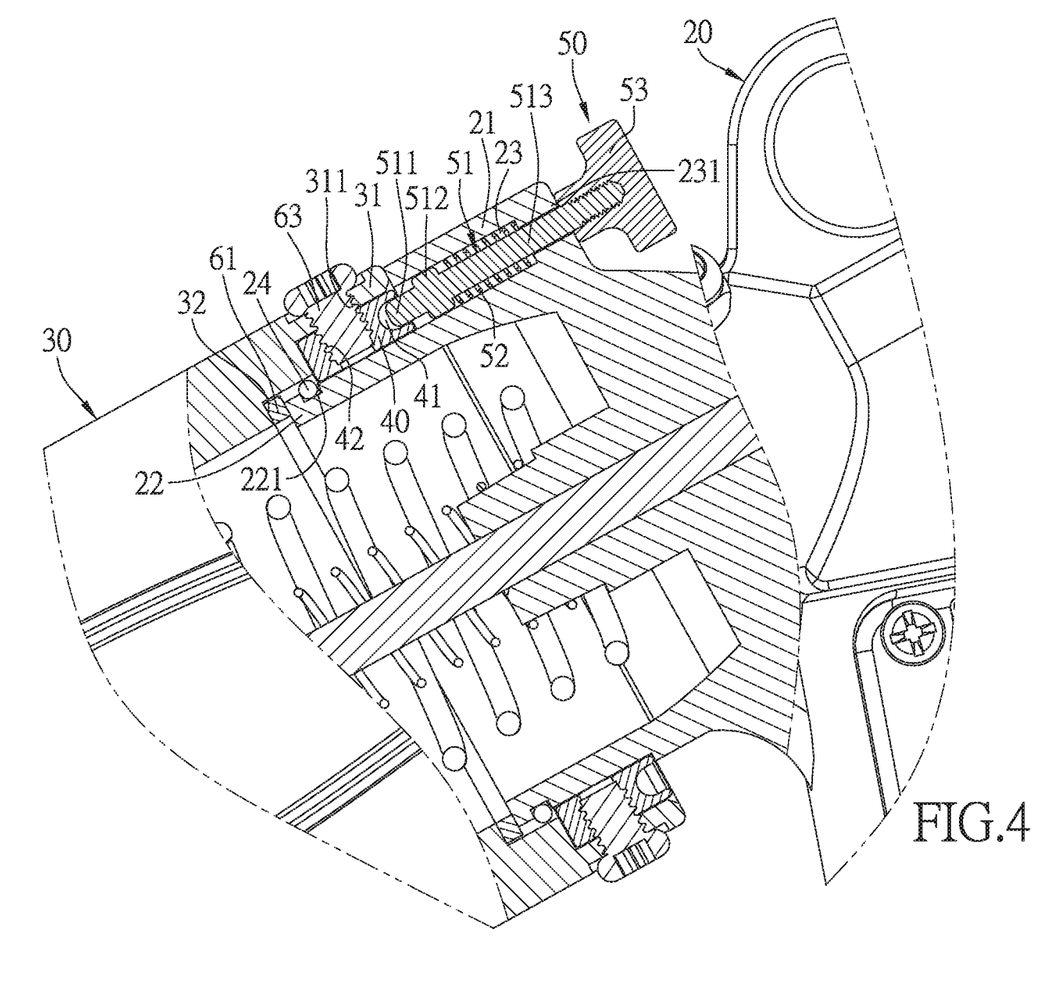
FIG. 4 is a partial assembly sectional view of the embodiment of the present invention, showing that the positioning unit is in the locked position.

Referring to FIGS. 2-4, the present invention provides a grease gun with an adjustable operating angle, which essentially comprises: a grease barrel 20, a gun body 30, a positioning ring 40, and a positioning unit 50.

The grease barrel 20 has a first annular assembling portion 21 and a first annular pivot portion 22 connected to the first annular assembling portion 21. In the present embodiment, the grease barrel 20 further has an assembling hole 23 penetrating the first annular assembling portion 21, and an annular shoulder 231 is formed on an inner surface of the assembling hole 23. The first annular pivot portion 22 is closer to the mouth of the grease barrel 20 than the first annular assembling portion 21, an annular groove 221 is formed in the first annular pivot portion 22, and a limiting ring 24 is disposed in and partially protruded from the annular groove 221.

The gun body 30 has a second annular assembling portion 31 facing the first annular assembling portion 21 and a second annular pivot portion 32 to be pivotally disposed on the first annular pivot portion 22. In this embodiment, the second annular assembling portion 31 is closer to the mouth of the gun body 30 than the second annular pivot portion 32, and is provided with a plurality of threaded holes 311. The second annular pivot portion 32 is an annular groove formed in the inner surface of the gun body 30. In addition, a sealing ring 61 is provided between the first annular pivot portion 22 and the second annular pivot portion 32 to prevent the gas entering the gun body 30 from leaking out from the pivot joint between the grease barrel 20 and the gun body 30.

The positioning ring 40 is fixed to the second annular assembling portion 31 of the gun body 30 and has a plurality of positioning cavities 41 arranged in an annular manner and facing the first annular assembling portion 21. In this embodiment, the positioning ring 40 is provided with a plurality of lock holes 42 aligned with the threaded holes 311 of the gun body 30, and the positioning ring 40 is fixed to the second annular pivot portion 32 of the gun body 30 by screws 63, which makes the positioning ring 40 be replaceable and easy to assemble. In addition, after the positioning ring 40 is assembled, the opening of each positioning cavity 41 faces the assembling hole 23 of the grease barrel 20, and the positioning ring 40 pushes against the limiting ring 24 partially protruded from the annular groove 221 to prevent the grease barrel 20 and the gun body 30 from separating from each other after pivoting.

Figure 6:
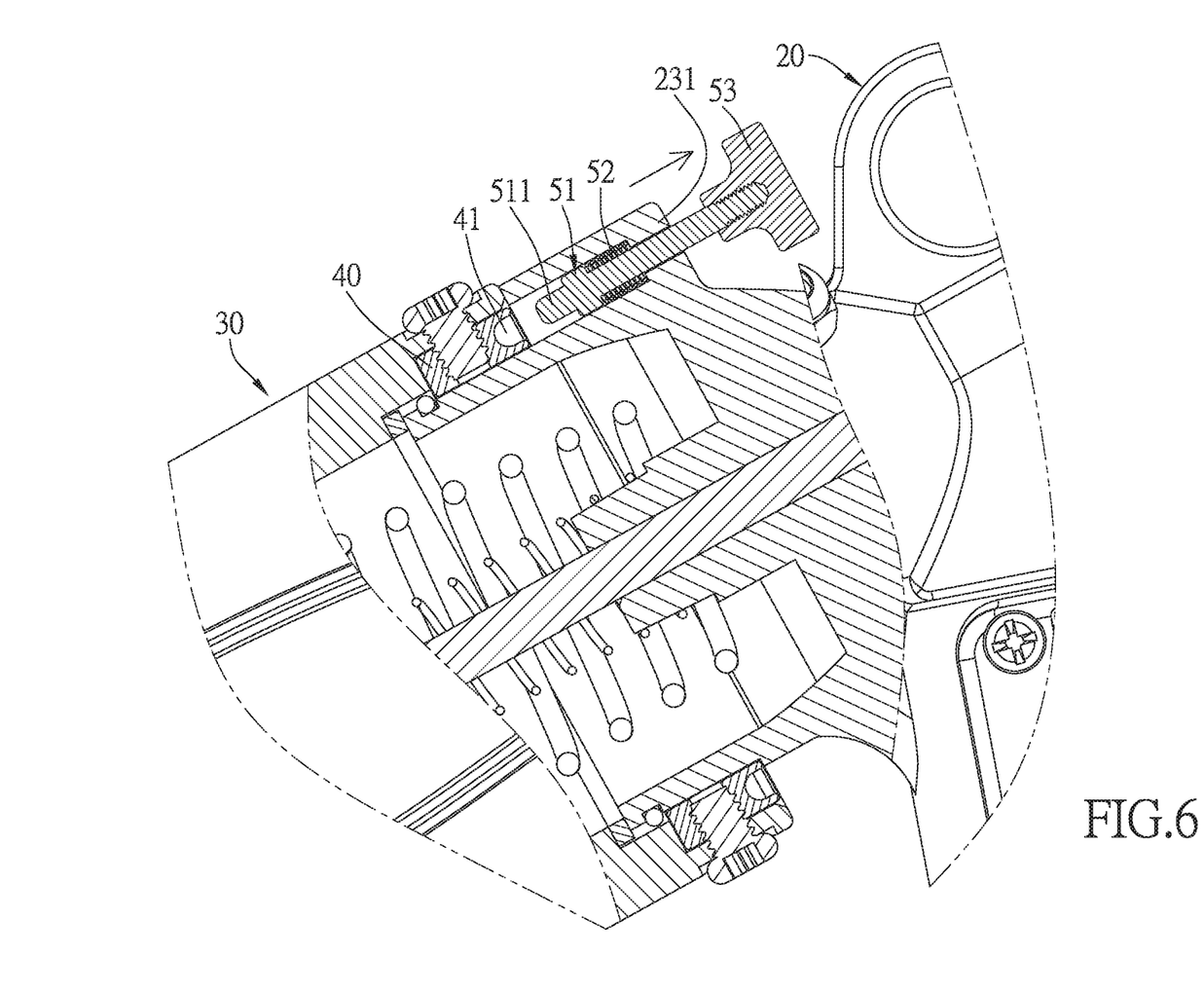
FIG. 6 is a partial assembly sectional view of the embodiment of the present invention, showing a state where the positioning unit is in a release position.

The positioning unit 50 includes a positioning member 51 movable between a locked position (as shown in FIG. 4) and a release position (as shown in FIG. 6), and the positioning member 51 has a positioning portion 511 to be inserted into or disengaged from the positioning cavities 41. In this embodiment, the positioning unit 50 further includes a return spring 52 and a connector 53. The positioning member 51 is movably disposed in the assembling hole 23 of the grease barrel 20, and sequentially provided with the positioning portion 511, a limiting portion 512, and a shaft portion 513 extending out of the assembling hole 23. The return spring 52 is sleeved on the shaft portion 513, and has two ends abutted against the annular shoulder 231 of the assembling hole 23 and the limiting portion 512 of the positioning member 51, respectively, to provide an elastic force for pushing the positioning member 51 to return to the locked position, when the positioning member 51 is in the released position. The connector 53 is disposed on the shaft portion 513 extending out of the assembling hole 23 for a user to hold and pull the positioning member 51 to move.

Figure 5:
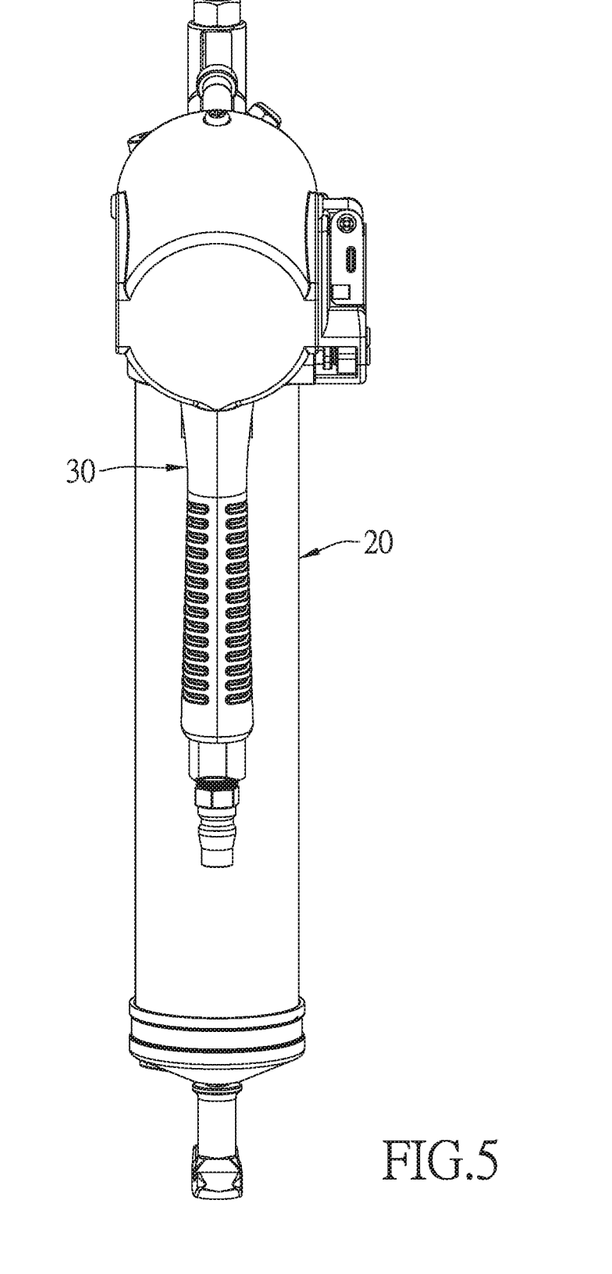
FIG. 5 is a side view of the embodiment of the present invention, showing a first relative angle between the grease barrel and the gun body.
Figure 7:
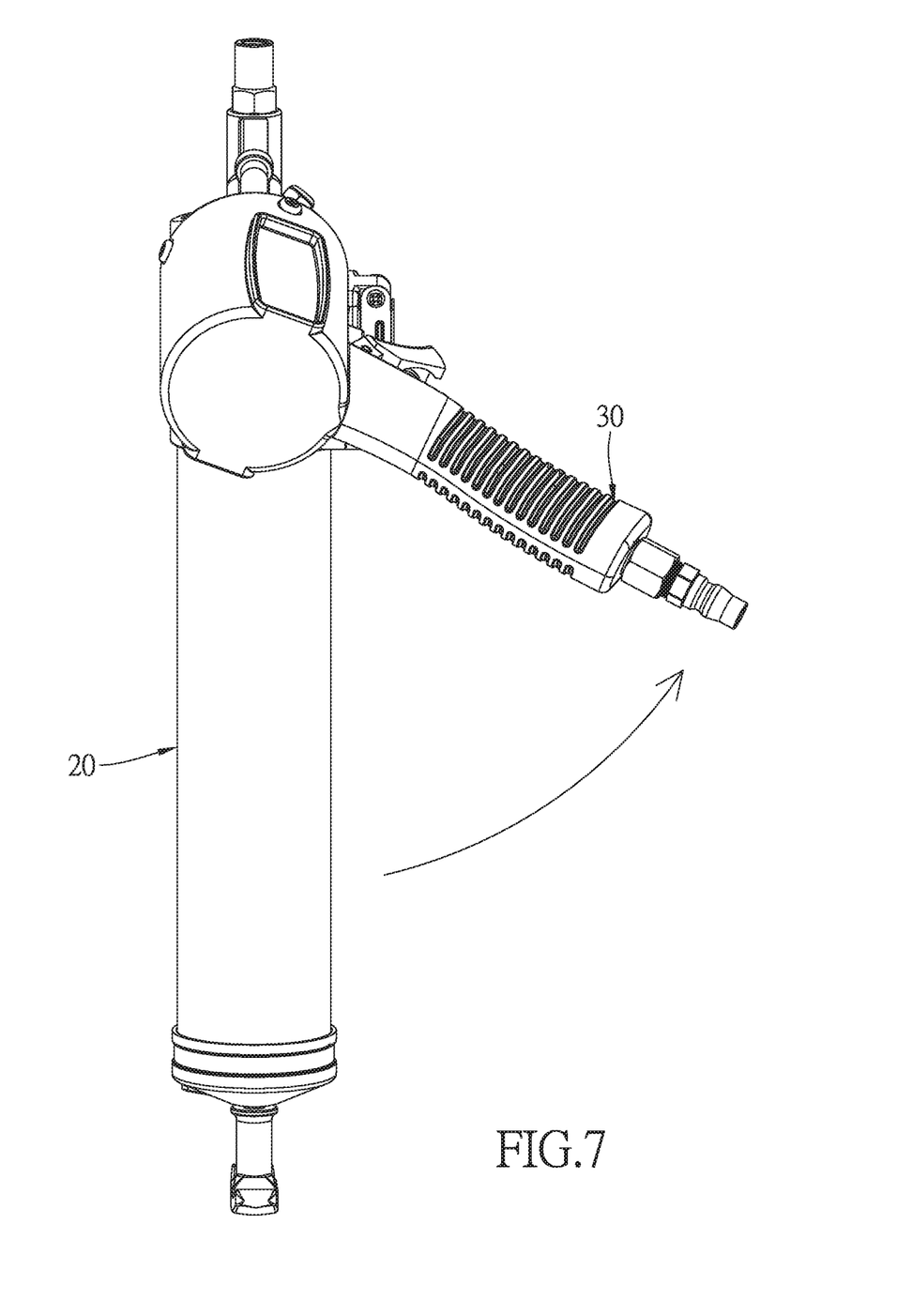
FIG. 7 is an assembly side view of the embodiment of the present invention, showing a second relative angle between the oil reservoir and the gun body.

Referring to FIGS. 4 and 5, which show that the positioning member 51 is in the locked position, and the grease barrel 20 and the gun body 30 is maintained at a first angle state. After performing the grease filling operation at this relative angle, if encountering restrictions on the operating posture when in other working environments, as shown in FIGS. 5 and 6, the user can hold the connector 53 and pull it backward so that the positioning member 51 is moved to cause the positioning portion 511 to be disengaged from the positioning cavity 41 of the positioning ring 40. At this moment, the positioning member 51 is in the release position, that is, the grease barrel 20 and the gun body 30 can be rotated relative to each other, so that the user can adjust the relative angle between the grease barrel 20 and the gun body 30 as required, and its adjustment state is shown in FIG. 7.

Figure 8:
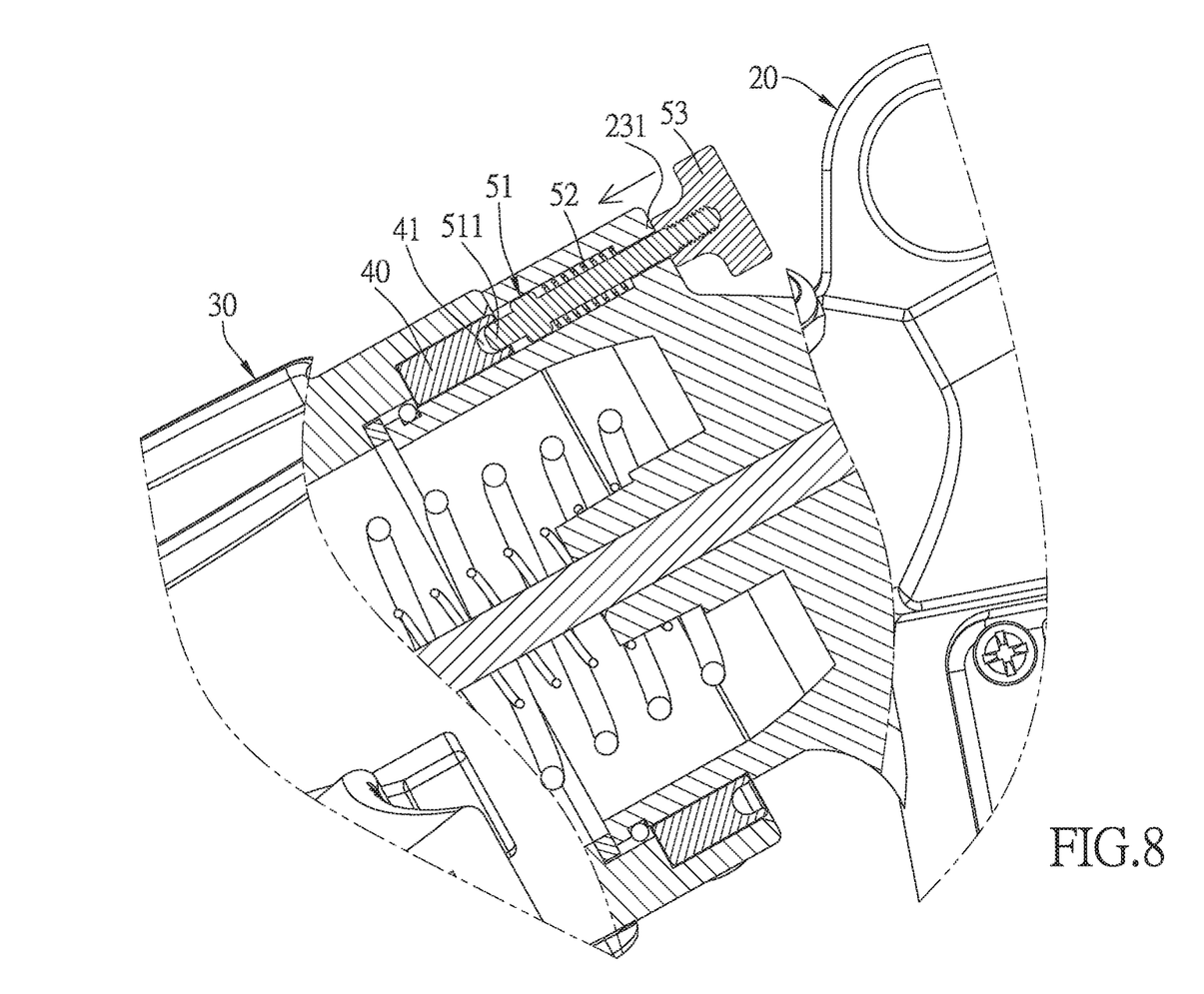
FIG. 8 is a partial assembly sectional view of the embodiment of the present invention, showing a state where the positioning unit is in a locked position after the grease barrel and the gun body are relatively adjusted.

After adjustment, as shown in FIGS. 6 and 8, release the connector 53, and the positioning member 51 is pushed back to the locked position by the elastic force accumulated by the return spring 52, so that the positioning portion 511 of the positioning member 51 is positioned in one of the positioning cavities 41 of the positioning ring 40 again, and the grease barrel 20 and the gun body 30 are fixed relative to each other, so as to obtain another operation angle to reduce the space limitation of the grease feeding operation.

While we have shown and described various embodiments in accordance with the present invention, it is clear to those skilled in the art that further embodiments may be made without departing from the scope of the present invention.

What is claimed is:

1. A grease gun with an adjustable operating angle, comprising:
    a grease barrel having a first annular assembling portion and a first annular pivot portion;
    a gun body having a second annular assembling portion facing the first annular assembling portion and a second annular pivot portion to be pivotally disposed on the first annular pivot portion;
    a positioning ring fixed to the second annular assembling portion of the gun body and having a plurality of positioning cavities arranged in an annular manner and facing the first annular assembling portion; and
    a positioning unit having a positioning member movable between a locked position and a release position, and the positioning member having a positioning portion to be inserted into or disengaged from the positioning cavities;
    when the positioning member is in the locked position, the positioning portion of the positioning member is inserted in one of the positioning cavities to prevent relative rotation between the grease barrel and the gun body, when the positioning member is in the release position, the positioning portion of the positioning member is disengaged from the positioning cavities to allow relative rotation between the grease barrel and the gun body, so as to adjust a relative angle between the grease barrel and the gun body.

2. The grease gun with the adjustable operating angle as claimed in claim 1, wherein a sealing ring is provided between the first annular pivot portion and the second annular pivot portion.

3. The grease gun with the adjustable operating angle as claimed in claim 1, wherein the positioning ring is fixed to the second annular pivot portion of the gun body by screws.

4. The grease gun with the adjustable operating angle as claimed in claim 1, wherein an annular groove is formed in the first annular pivot portion, and a limiting ring is disposed in and partially protruded from the annular groove to push against the positioning ring.

5. The grease gun with the adjustable operating angle as claimed in claim 1, wherein the grease barrel further has an assembling hole penetrating the first annular assembling portion, an annular shoulder is formed on an inner surface of the assembling hole, the positioning unit further includes a return spring and a connector, the positioning member is movably disposed in the assembling hole and sequentially provided with the positioning portion, a limiting portion, and a shaft portion extending out of the assembling hole, the return spring is sleeved on the shaft portion and has two ends abutted against the annular shoulder of the assembling hole and the limiting portion of the positioning member, respectively, and the connector is disposed on the shaft portion extending out of the assembling hole.

\* \* \* \* \*